B. F. AMISS.
LEACH SPRAYER.
APPLICATION FILED OCT. 25, 1913.
1,130,561.
Patented Mar. 2, 1915.
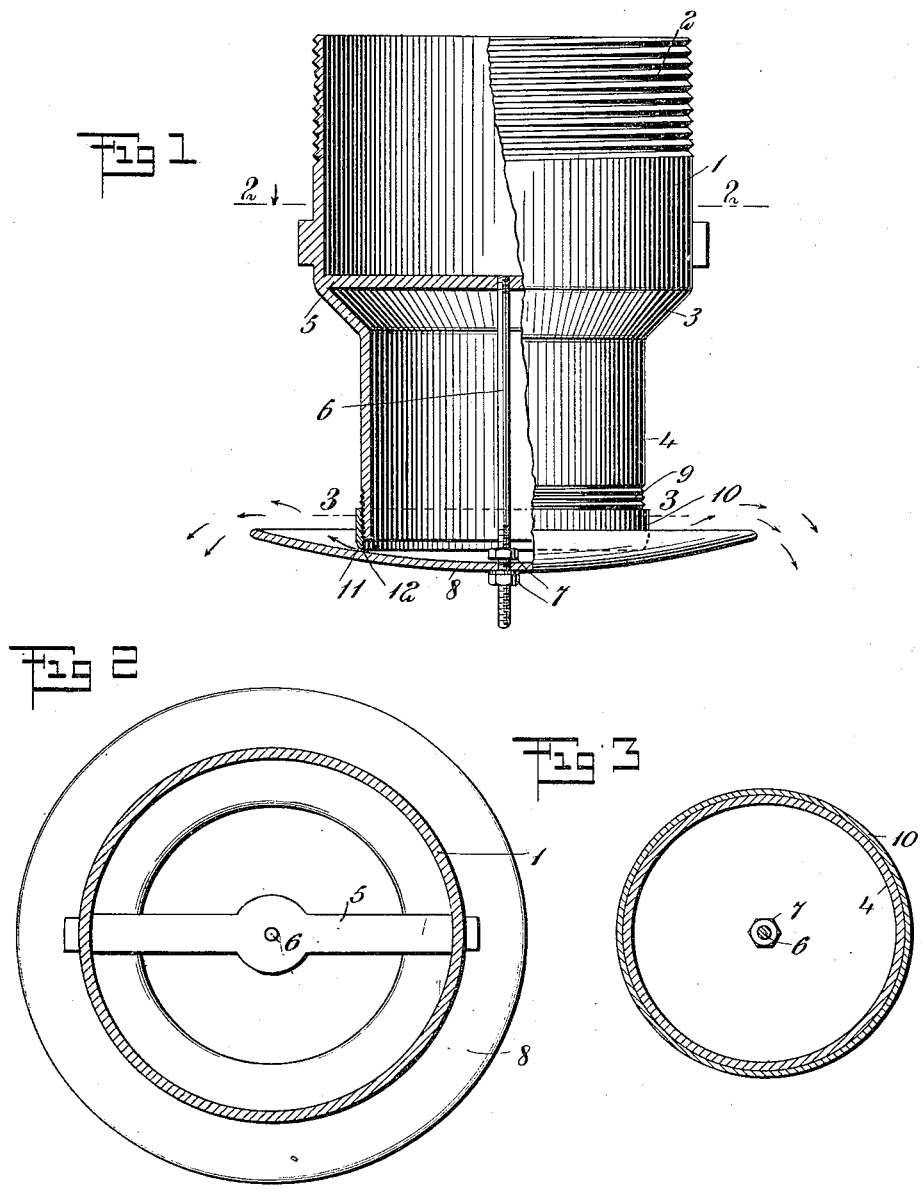

UNITED STATES PATENT OFFICE.

BENJAMIN FRANKLIN AMISS, OF SALEM, VIRGINIA.

LEACH-SPRAYER.

1,130,561. Specification of Letters Patent. Patented Mar. 2, 1915.

Application filed October 25, 1913. Serial No. 797,203.

*To all whom it may concern:*

Be it known that I, BENJAMIN F. AMISS, a citizen of the United States, and a resident of Salem, in the county of Roanoke and State of Virginia, have invented a new and Improved Leach-Sprayer, of which the following is a full, clear, and exact description.

This invention relates to improvements in spraying devices, and particularly to spraying devices for leaching fluids, and has for an object to provide an improved structure which will spray the fluid over a comparatively large area, and which will not become clogged or stopped.

Another object of the invention is to provide a leach sprayer which distributes or sprays the fluid through the use of an inverted plate and an adjustable ring co-acting therewith, whereby the fluid may be distributed over a considerable area, and in any desired bulk.

In carrying out the object of the invention a suitable substantially tubular member is provided arranged to be screwed into a conduit pipe or other supply member. This tubular member is provided with a cross bar intermediate its length for supporting a rod which in turn adjustably supports a distributing disk. The distributing disk is inverted and co-acts with a cone or ring threaded on to the tubular member in such a manner as to be moved toward and from the distributing plate. In this way the sheet of leaching liquor distributed may be varied or adjusted as desired.

In the accompanying drawing—Figure 1 is a side view, certain parts being broken away for disclosing a sprayer embodying the invention; Fig. 2 is a section through Fig. 1 on line 2—2; Fig. 3 is a section through Fig. 1 approximately on line 3—3.

Referring to the accompanying drawing by numeral 1 indicates a tubular member formed with a threaded upper part 2 for screwing into a supply pipe or other suitable supply means. The tubular member 1 is offset or reduced at 3, whereby a restricted portion 4 is presented. At portion 3 is arranged a bar 5 to which is removably secured a bar 6 provided with a pair of nuts 7 near the lower end. Bar 6 is threaded for a considerable distance at the lower end so as to allow the nuts 7 a large adjustment. The lower end of bar 6 passes through an inverted cup-shaped plate 8, and is clamped rigidly to bar 6 by nuts 7. By adjusting the nuts 7, plate 8 may be raised and lowered, or will move toward and from tubular member 1. The plate 6 is preferably cupped sufficiently to extend slightly above the lower edge of the reduced portion 4 at all times, though if desired the adjustment on bar 6 is sufficient to allow the outer edge or periphery of plate 8 to fall slightly below member 4. Member 4 is provided with threads 9 at the lower end which accommodate the threaded ring or cone 10. The ring or cone 10 is preferably beveled at 11 for producing an edge 12, which edge is caused to approach or recede from plate 8 as ring 9 is rotated or screwed on and off member 4. From this it will be observed that the plate 8 may be adjusted, and also the ring 10 may be adjusted. By these adjustments the sheet of leaching fluid may be of any desired thickness and consequently may be distributed over a greater or less area. The distance between ring 10 and plate 8 is adjusted for substantially the right amount of fluid when the same is under a certain pressure. After the fluid has been turned on, ring 10 may then be adjusted for giving the final adjustment in order that the spray may be of the right size and volume for the correct distribution. By providing an annular opening, as for instance the opening between ring 10 and plate 8 no clogging or stopping up will arise as in the case of apertured spring heads. Also, by the various adjustments presented the spraying device may be adjusted properly for each particular spraying fluid used.

What I claim is:—

1. In a spraying device of the character described, a tubular member, a bar arranged transversely in said tubular member intermediate the length thereof, a supporting rod connected with said bar, a cup-shaped plate arranged below said tubular member and through which the said supporting rod extends, the concave face of said plate facing the end of said tubular member, a pair of nuts mounted on said rod for adjustably connecting said plate with said rod, and a ring threaded on the lower end of said tubular member and beveled to form an edge, said ring being adjustable to cause said edge to approach or recede from said plate.

2. In a spraying device, of the character described, a tubular member having a threaded end for attachment to a supply means, the said member having an offset forming a reduced portion, a cross bar arranged at said offset, a supporting member removably secured at one end to said cross bar and extending through the reduced portion of said tubular member, a cup shaped plate having its concave face facing the said reduced end of the tubular member, the said plate being adjustable on the projecting end of said supporting member toward and from the reduced end of said tubular member, so that the said end of the tubular member may be either within the cup or exterior to it, and a ring threaded on the end of the reduced portion of the tubular member and having its edge beveled, the said ring being adjustable to move said edge toward and from the inner or concave face of said cup shaped plate.

In testimony whereof I have signed my name to this specification in the presence of two subscribing witnesses.

BENJ. FRANKLIN AMISS.

Witnesses:
W. H. TINSLEY,
H. G. TINSLEY.

Copies of this patent may be obtained for five cents each, by addressing the "Commissioner of Patents, Washington, D. C."